US012350779B2

(12) United States Patent
Greif et al.

(10) Patent No.: US 12,350,779 B2
(45) Date of Patent: Jul. 8, 2025

(54) DEVICE AND METHOD FOR MONITORING A WORK SPINDLE

(71) Applicant: Ott-Jakob Spanntechnik GmbH, Lengenwang (DE)

(72) Inventors: Josef Greif, Friesenried (DE); Wolfgang Bechteler, Ebenhofen (DE); Bartholomäus Reisacher, Jr., Buchloe (DE); Florian Merz, Rieden (DE)

(73) Assignee: Ott-Jakob Spanntechnik GmbH, Lengenwang (DE)

( * ) Notice: Subject to any disclaimer, the term of this patent is extended or adjusted under 35 U.S.C. 154(b) by 700 days.

(21) Appl. No.: 17/732,739

(22) Filed: Apr. 29, 2022

(65) Prior Publication Data

US 2022/0347812 A1 Nov. 3, 2022

(30) Foreign Application Priority Data

Apr. 30, 2021 (DE) ...................... 10 2021 111 159.5

(51) Int. Cl.
*B23Q 17/22* (2006.01)
*B23Q 3/06* (2006.01)
(Continued)

(52) U.S. Cl.
CPC ........... *B23Q 17/2225* (2013.01); *B23Q 3/06* (2013.01); *H02K 7/14* (2013.01); *H02K 15/14* (2013.01); *B23Q 2703/02* (2013.01)

(58) Field of Classification Search
CPC .. B23Q 17/2225; B23Q 3/06; B23Q 2703/02; B23Q 17/002; B23Q 1/70; H02K 7/14; H02K 15/14
See application file for complete search history.

(56) References Cited

U.S. PATENT DOCUMENTS 8,142,118 B2  3/2012 Martens
8,259,004 B2 * 9/2012 Bonerz .............. B23Q 17/2476
                                                      408/239 R
(Continued)

FOREIGN PATENT DOCUMENTS

DE        4201013 A1    7/1993
DE       10349873 A1    5/2005
(Continued)

OTHER PUBLICATIONS

Office Action dated Mar. 19, 2024 for Japanese Patent Application No. 2022-0722194.
(Continued)

*Primary Examiner* — Yaritza Guadalupe-McCall
(74) *Attorney, Agent, or Firm* — Paul D. Bianco; Fleit Intellectual Property Law (57) ABSTRACT

In a device for recording deformation of a rotor head of a work spindle, at least one magnet is arranged on a stator or a rotor of the spindle, the magnetic field of which penetrates a measurement section of the rotor head, which is traversed by an axial flow of force during clamping of a tool or tool carrier on the rotor head by a tool clamping device arranged in the rotor. The rotor head has a magnetizability or magnetization that varies in the axial direction in its measurement section, and at least one direction-sensitive magnetic field sensor is arranged on the stator radially opposite the measurement section, which is connected to an evaluation device to determine axial deformation of the rotor head as a function of rotation angle from the strength of the magnetic field as a function of rotation angle recorded by the sensor during one revolution of the rotor.

15 Claims, 5 Drawing Sheets

(51) Int. Cl.
    *H02K 7/14*          (2006.01)
    *H02K 15/14*        (2006.01)

(56) References Cited

U.S. PATENT DOCUMENTS

| | | | |
|---|---|---|---|
| 10,259,090 B2 * | 4/2019 | Van Sprang | B23Q 17/005 |
| 11,123,834 B2 * | 9/2021 | Van Sprang | G01B 7/30 |
| 11,618,119 B2 * | 4/2023 | Van Sprang | B23Q 17/005 |
| | | | 408/1 R |
| 11,667,002 B2 * | 6/2023 | Aschauer | B23Q 11/0085 |
| | | | 29/559 |
| 12,030,149 B2 * | 7/2024 | Van Sprang | G05B 19/4065 |
| 2022/0347812 A1 * | 11/2022 | Greif | H02K 7/14 |

FOREIGN PATENT DOCUMENTS

| | | | | |
|---|---|---|---|---|
| DE | 102016112924 A1 * | 1/2017 | | B23Q 17/003 |
| EP | 1 889 685 A1 | 2/2008 | | |

OTHER PUBLICATIONS

Examination Report dated Apr. 6, 2022 for German Application No. 10 2021 111 159.5 (English Translation).

* cited by examiner

DEVICE AND METHOD FOR MONITORING A WORK SPINDLE

FIELD OF THE DISCLOSURE

The disclosure relates to a device and method for monitoring of a work spindle.

BACKGROUND

Debris on tool contact surfaces of machine tools can result in suboptimal tool clamping. Debris can consist of material chips that inevitably occur during machining of a workpiece. Faulty machining can occur due to a misalignment or an axial offset of the tool. This effect is further intensified by the use of long tools. To improve production quality and reduce rejects it is desirable to be able to recognize the occurrence of incorrect tool clamping even before the start of machining. It has therefore already been proposed to check the quality of tool clamping in machine tools by monitoring the contact surface of the tool.

EP 1 889 685 B1 discloses a monitoring device with a measurement device provided on the circumferential surface of a spindle head, which monitoring device detects fluctuations or deformations occurring on the lateral or circumferential surface due to an imbalance or the presence of debris. It can be a mechanical dial gauge, whose probe lies on the circumferential surface of the spindle head, or the sensor can be arranged on the spindle head as an inductive or capacitive sensor or in the form of a strain gauge. A mechanized, electrical, electromechanical, acoustic or optical measurement device is also mentioned as a possibility. Except for the mechanical dial gauge, the specific implementation of the mentioned types of measurement devices is not discussed, however. The sensor is arranged on a section of the rotor that protrudes from the stator of the work spindle on its front side.

Mechanical probing of the circumferential surface of the rotor head of a work spindle with a dial gauge requires slow revolution of the rotor and subsequent removal of the probe from the rotor surface at normal operating speed. Active measurement systems with a sensor mechanism on the rotor and with power and data transmission between the stator and rotor are demanding to perform and are therefore costly, and can only be replaced at considerable expense. The mechanical rigidity of the rotor is reduced by the incorporation of sensors. Measurement systems that measure eccentricity in the vicinity of the tool extend into the machining space. A sensor is undesired there, since chips can collect there and the sensor is difficult to protect.

Mounting an additional measurement ring on the rotor so that it experiences all deformations is only possible with difficulty. When eccentricity is measured farther away from the tool, corresponding lower deformation of the rotor is present, so that the measuring accuracy is compromised.

SUMMARY

Given the foregoing, one aspect of the disclosure relates to a device and method for monitoring a work spindle that overcomes the drawbacks of the prior art and makes it possible to recognize incorrect tool clamping with high accuracy and reliability by measuring deformation of the rotor head of the work spindle from clamping of the tool or tool carrier.

Accordingly, disclosed herein are a device and method for monitoring of a work spindle. Advantageous embodiments are also disclosed herein.

In a device for detecting deformation of the rotor head or work spindle according to the disclosure, at least one magnet is arranged on the stator or on the rotor of the work spindle, whose magnetic field penetrates a measurement section of the rotor head that is traversed by the axial flux during clamping of a tool or tool carrier on the rotor head by means of a tool clamping device arranged in the rotor. The rotor head has in its measurement section a magnetizability or magnetization varying in the axial direction, and at least one direction-sensitive magnetic field sensor is arranged on the stator radially opposite the measurement section of the rotor head, which is connected to an evaluation device that is set up to determine a measure of the axial deformation of the rotor head as a function of rotation angle from the strength of the magnetic field as a function of rotation angle detected by the magnetic field sensor during one revolution of the rotor.

In this way, the mean axial deformation of the rotor head in the circumferential direction can be determined, which depends on the clamping force of the tool clamping device, so that its monitoring is made possible, as well as determining a variation of deformation in the circumferential direction, which is a clear indication of the presence of fouling of a contact surface between a clamped tool or tool carrier and the rotor head, especially in the form of a chip on the front contact surface of the rotor head. A magnetic field sensor is contactless in operation and requires no signal transmission between the rotor and stator. The sensor and the entire signal processing electronics can be accommodated within the stator at one location, where it is protected from debris and mechanical influences of any type.

It is also advantageous if the evaluation device is set up to determine a measure of the axial position of the rotor head relative to the stator from the strength of the magnetic field as a function of rotation angle detected by the magnetic field sensor during one revolution of the rotor. In this way, the systematic axial displacement of the rotor relative to the stator during operation of a work spindle—known as spindle growth, the extent of which must be known for its compensation during axial tool positioning—can be detected by means of the same sensor.

A magnet with radial alignment of its poles is preferably arranged on the stator radially opposite the measurement section of the rotor head and the measurement section of the rotor head has on its surface at least two grooves running in the circumferential direction and separated from each other in the axial direction. A strong distortion of the magnetic field at the location of the sensor can be simply produced by this structure from axial deformation and/or displacement of the rotor head.

Such grooves preferably have at least one marking of predetermined length in the circumferential direction at one location in the circumferential direction of the measurement section of the rotor head in the form of an interruption or an axial offset of predetermined extent. A zero reference point for the rotation angle of the rotor head is thereby created, which can be detected by the magnetic field sensor itself so that no additional sensor mechanism is required for this purpose. If an axial displacement of predetermined extent is used as marking, the additional possibility of self-calibration of the magnetic field is gained, in which case an axial shift of known size can be assigned to the signal change that occurs when the offset groove section is passed.

As an alternative to a magnet on the stator and grooves in the rotor head, at least three magnets can be arranged axially in sequence in the measurement section of the rotor head or at least three axially consecutive areas of the rotor head can be magnetized, in which case the magnetic poles are each aligned in the radial direction and every two axially consecutive magnets or magnetized areas have a reversed radial arrangement of the magnetic poles. An axial distortion of a magnetic field penetrating the magnetic field sensor is also thereby produced during axial deformation or displacement of the rotor head.

In like manner to an interruption or axial offset of grooves of predetermined extent, magnets or magnetized areas arranged in the measurement section of the rotor head can have a marking of predetermined length in the circumferential direction at least at one location in the circumferential direction of the measurement section of the rotor head in the form of an interruption of magnetization or axial offset of magnetization of predetermined extent, in order to create a zero reference point for the rotation angle of the rotor and permit self-calibration of the magnetic field sensor.

The magnetic field sensor is preferably a magnetoresistive sensor having at least one bridge circuit of resistors, the values of each of which depends on the strength and direction of the magnetic field penetrating it; the axial variation of magnetizability or magnetization of the measurement section of the rotor head is periodic; and the geometric arrangement of the resistors is coordinated with this axial variation in the axial direction, so that an axial displacement of the rotor head relative to the stator by the length of one period of the axial variation results in a periodic waveform of the output signal of the bridge circuit as a function of the axial displacement of the rotor head with the same period length.

Magnetoresistive sensors are highly sensitive and have a pronounced directional dependence, as is essential for implementation according to the disclosure. This permits position and deformation measurement with very high resolution in the nanometer range. Conversion of a change in sensor signal to a position change or deformation is greatly simplified by the coordination between the structure of the sensor and the axial variation of magnetizability or magnetization.

The evaluation device preferably contains a memory, which stores a reference signal that was derived from at least one sensor signal recorded during a revolution of the rotor with a properly clamped tool or tool carrier, and which is set up to determine the axial deformation of the rotor head by means of the deviation between the signal derived from at least one sensor signal, recorded during one revolution of the rotor with a clamped tool or tool carrier, and the stored reference signal. Interfering effects, such as the noise of a recorded measurement signal, which here does not mean temporal noise, but spatial noise, or a systematic offset of a recorded measurement signal can thereby be largely eliminated.

The evaluation device is preferably set up to derive a signal from the axial deformation of the rotor head that indicates an incorrect clamping state of the tool or tool carrier. Such an incorrect clamping state can consist either of fouling of a tool contact surface of the rotor head or insufficient clamping force as a result of a defect or excessive wear of the tool clamping device.

A number of direction-sensitive magnetic field sensors can also be arranged on the stator separate from each other in the circumferential direction of the stator radially opposite the measurement section of the rotor head and each connected to the evaluation device. This can speed up the measurement, in which case a full revolution of the rotor is not necessary in order to record the axial position of the measurement section of the rotor head over the entire circumference of the rotor head, or the measurement can be conducted at a number of points along the circumference of the rotor head simultaneously with the rotor at a standstill.

A method for monitoring a work spindle by means of a device according to the disclosure has the following steps:

a) Recording of at least one signal, which is derived from at least one signal produced by a magnetic field sensor within one revolution of the rotor with a tool or tool carrier clamped on the rotor of the work spindle;

b) Calculation from the recorded signal of a position signal, which indicates the axial position of a measurement section of the rotor head radially opposite the magnetic field sensor as a function of the angle of rotation of the rotor within one revolution of the rotor;

c) Calculation of a difference signal as a function of angle of rotation of the rotor within one revolution of the rotor from the calculated position signal and a reference signal stored in a memory;

d) Determination of at least one measure of the axial deformation of the rotor head from the calculated difference signal, e) Comparison of the determined measure of the axial deformation of the rotor head with a limit value and production of a status signal that indicates an incorrect clamping state of a clamped tool or tool carrier, as a function of the comparison result.

By forming the difference between the position signal calculated from the recorded measured values and a stored reference signal, interfering effects can be largely eliminated and a reliable measure of the deformation of the rotor head determined, by which means it can be simply evaluated by comparison with a limit value whether the clamping state of the tool or tool carrier is correct or incorrect.

The reference signal is preferably determined by using steps a) and b) during proper clamping of an equivalent tool or tool carrier and stored in the memory. A criterion for evaluating a current clamping state as correct or incorrect is thereby simply defined.

During performance of step c) the corresponding mean value of the position signal and the reference signal is preferably calculated and its mean value initially subtracted from each of the two signals. To calculate the difference signal, the mean-free reference signal is then subtracted from the mean-free position signal and the status signal indicates the presence of debris between a clamped tool or tool carrier and a surface of the rotor head. Due to the subtraction of the corresponding mean values, a systematic offset in the sensor signal has no effect on the accuracy of the calculation of the deviation between the current position signal and the reference signal.

A status signal indicating the exertion of insufficient clamping force by the tool clamping device can be generated if, during determination of the reference signal, steps a) and b) are performed a first time without axial action of force on the rotor head and a second time with properly clamped equivalent tool or tool carrier, the reference signal is calculated by subtracting the position signal obtained during the first performance from the position signal obtained during the second performance, and during performance of step c) the corresponding mean value of the position signal and the reference signal is calculated and the mean value of the reference signal is subtracted from the mean value of the position signal to calculate the difference signal. An additional type of error function of tool clamping can therefore be recognized using the same measurement device merely by performing an additional measurement and by expansion of signal processing.

An axial displacement of the rotor head relative to the stator can be calculated by subtraction of the reference mean value from the current mean value and sent to a higher level control unit by conducting steps a) and b) without axial action of force on the rotor head in a defined reference state of the working spindle, calculating the mean value of the obtained position signal and storing it as reference mean value and conducting steps a) and b) without axial action of force on the rotor head in a current operating state of the work spindle and calculating the actual mean value of the obtained position signal. Additional status information significant for operation of a work spindle in the form of axial displacement of the rotor head can therefore be recorded using the same measurement device and a deterioration in quality of workpiece machining can be avoided merely by expansion of signal processing.

BRIEF DESCRIPTION OF THE DRAWINGS

An embodiment example of the disclosure is described below with reference to the drawings. In the drawings

DETAILED DESCRIPTION

Figure 1:
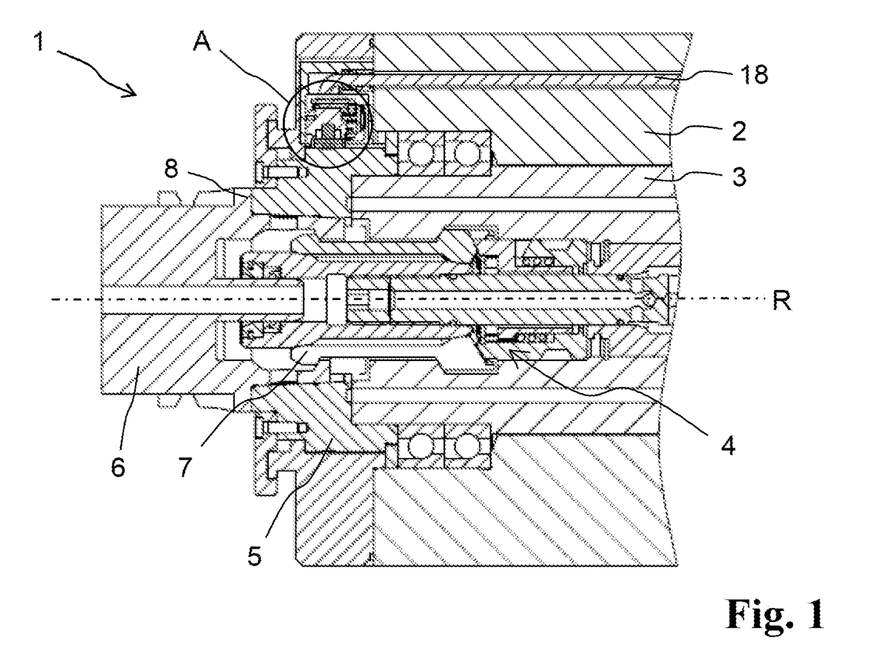
FIG. 1 shows the front part of a work spindle with a clamped tool carrier.

FIG. 1 shows the front end section of work spindle 1, the main components of which are stator 2 and a rotor 3 positioned therein. A tool clamping device 4 is situated in rotor 3, by means of which a tool carrier 6 is clamped on a front end section 5 of rotor 3, referred to below as rotor head 5. This structure of work spindle 1 is known among experts and therefore requires no further explanation here. The tool clamping device 4 has a number of collets 7 along its periphery, which exert a uniformly distributed clamping force on tool carrier 6 in the circumferential direction, which acts on rotor head 5 in the axial direction over the contact surface 8.

The presence of debris, especially in the form of a chip on contact surface 8, causes an irregularity in the distribution of clamping force in the circumferential direction and therefore also a corresponding irregularity in elastic deformation of rotor head 5. This irregularity of deformation of rotor head 5 has both a radial and an axial component, the terms axial and radial always referring here to the axis of rotation R of the work spindle. The axial component of such an irregular deformation of rotor head 5 is measured according to the disclosure. The structure of the measurement device is described below with reference to FIG. 2, which shows an enlargement of the section of the front end section of work spindle 1 marked A in FIG. 1.

Figure 2:
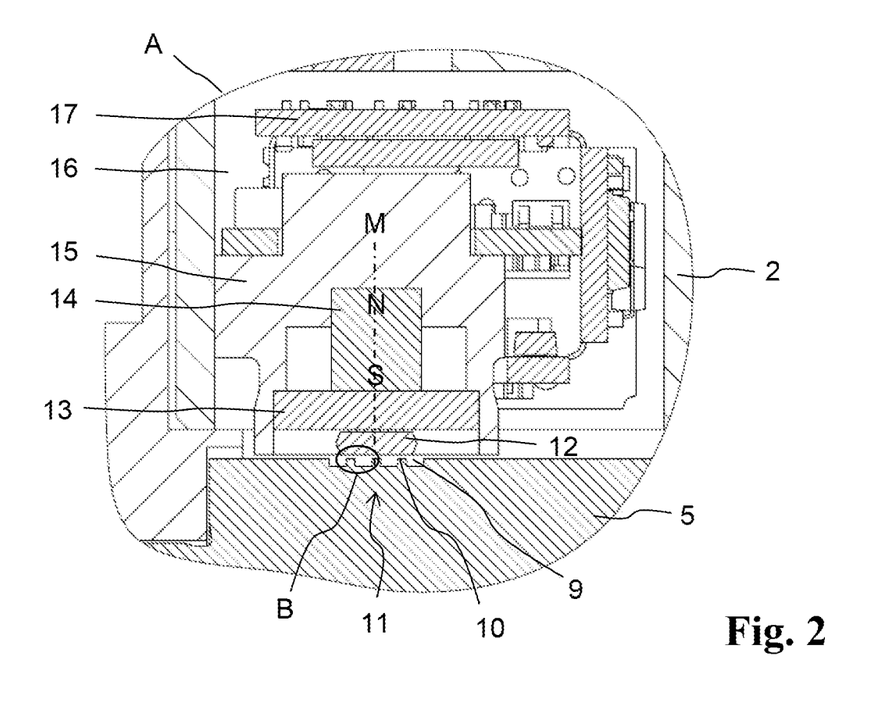
FIG. 2 shows an enlarged view of section A of FIG. 1.

The measurement device on the side of the rotor head 5, as shown in FIG. 2, consists of a series of grooves 9 separated axially from each other in the circumferential direction on the outer surface of rotor head 5. Every two adjacent grooves 9 are separated from each other by a land 10 also running in the circumferential direction. All grooves 9 have the same width. This also applies for the lands 10, so that a periodic sequence of grooves 9 and lands 10 is obtained in the axial direction. Four grooves 9 and three lands 10 are provided in the example depicted in FIG. 2. The grooves 9 and lands 10 together define a measurement section 11 of the rotor head. It is essential that the measurement section 11 lie in an area of rotor head 5 that is penetrated by a flux in the axial direction during clamping of a tool or tool carrier 6, so that an elastic deformation of measurement section 11 occurs in the axial direction from the aforementioned clamping. With correct tool clamping this is approximately the same along the periphery of rotor head 5, whereas in the case of fouling it varies irregularly along the periphery of rotor head 5.

The measurement device on the side of stator 2 contains a magnetic field sensor 12 designed in the form of a chip on a printed circuit board 13, which is incorporated in a cavity in stator 2, so that the magnetic field sensor 12 lies radially opposite measurement section 11 of rotor head 5 and is only separated from it by a narrow radial gap. A permanent magnet 14 is arranged on the radial outer side of circuit board 13 symmetrically to magnetic field sensor 12, so that its magnetic field runs in the radial direction in its interior. The south pole of permanent magnet 14 in the example depicted in FIG. 2 is situated on its radial inner end and the north pole on its radial outer end. Without the special shaping of measurement section 11 of rotor head 5, the magnetic field lines would run accordingly through the printed circuit board 13 and sensor chip 12 approximately radially and at least symmetrically to a common radial center axis M of the magnetic field sensor 12 and permanent magnet 14.

Through the grooves 9 and lands 10 of measurement section 11 the magnetic field of permanent magnet 14 is distorted in the axial direction in the area of magnetic field sensor 12, but the distortion is uniform along the entire circumference of rotor head 5 without deformation of rotor head 5 or during uniform deformation of rotor head 5 in the axial direction along the circumference of rotor head 5. If the axial deformation of rotor head 5 is nonuniform along the circumference of rotor head 5, as in the case of a chip present on the contact surface 8 (FIG. 1) during clamping of a tool or tool carrier 6, then so is the distortion of the magnetic field through measurement section 11.

The distortion of the magnetic field is dependent on the position of grooves 9 if the material of which the rotor head 5 consists has high magnetic permeability, and especially is ferromagnetic, which can generally be assumed for a rotor head 5 of a work spindle 1 of a machine tool. The grooves 9 can be filled with a non-magnetic material, especially a plastic, to avoid fouling.

The axial distortion of the magnetic field through measurement section 11 is measured according to the disclosure by means of a magnetic field sensor 12, which has a high direction-dependent sensitivity. The printed circuit board 13 with the magnetic field sensor 12 and permanent magnet 14 is incorporated in a housing 15, which in turn is incorporated in a cavity 16 in stator 2 and on the back of which signal processing electronics 17 is added. A cable 18 (FIG. 1) leads from it out of stator 2 of the work spindle 1 to the machine control of the machine tool, of which work spindle 1 is a component. Signal transmission from rotor 3 to stator 2 is therefore not required.

A known type of direction-sensitive magnetic field sensor 12 is a magnetoresistive sensor, in which the value of an electrical resistance is highly dependent on the direction of a magnetic field penetrating it. Such magnetoresistive sensors are known per se and are available on the market, specifically in the form of four resistors connected into a bridge circuit, so that their output signal is proportional to the strength of a magnetic field in the direction of sensitivity of the magnetic field sensor 12. Two such bridge circuits of magnetic field-sensitive resistors are typically provided together on a chip in a certain geometric arrangement, which is explained below.

Figure 3:
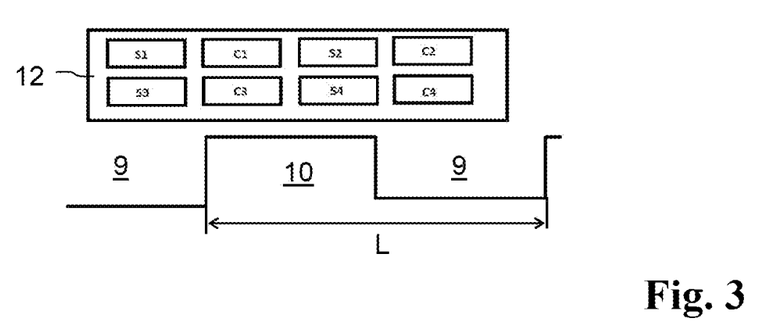
FIG. 3 shows an electrical block diagram of a device according to the disclosure.

FIG. 3 shows a section of the measurement section 11 of rotor head 5 with a period of length L of the sequence of grooves 9 and lands 10. The magnetic field sensor 12 contains two magnetoresistive bridge circuits, whose respective resistors S1 to S4 and C1 to C4, as shown schematically in FIG. 3, are arranged nested in the direction of the position of measurement section 11 being measured, i.e., in the axial direction of rotor head 5 here, so that in this direction a resistor Sn of one bridge circuit is always followed by the corresponding resistor Cn of the other bridge circuit, in which two resistors of each bridge circuit are arranged one above the other.

The length of the entire resistor arrangement in the direction of the position of measurement section 11 being measured and the period length L of the sequence of grooves 9 and lands 10 are matched here to each other, so that during a displacement of measurement section 11 by a period length L, the one bridge circuit, consisting of resistors S1 to S4, produces one period of a sinusoidal output signal, and the other bridge circuit, consisting of resistors C1 to C4, produces one period sifted in phase by 90°, i.e., a cosinusoidal output signal. In this case, an output signal linearly dependent on the axial position of measurement section 11 can be generated from the two bridge output signals within one period length L by applying the known arctan 2 function.

This concept of path measurement is known per se and therefore requires no further explanation here. It is ordinarily used to measure large displacement paths amounting to a multiple of the period length L or for speed measurement on gears. However, the concept is used according to the disclosure to measure the smallest deformations in the nanometer range along the periphery of a rotor head 5 of a work spindle 1, which represents a significant departure in terms of purpose from previously known applications. For this purpose, a different type of signal processing is required than for measurement of large displacement paths or speeds. This special type of signal processing is described below.

Figure 4:
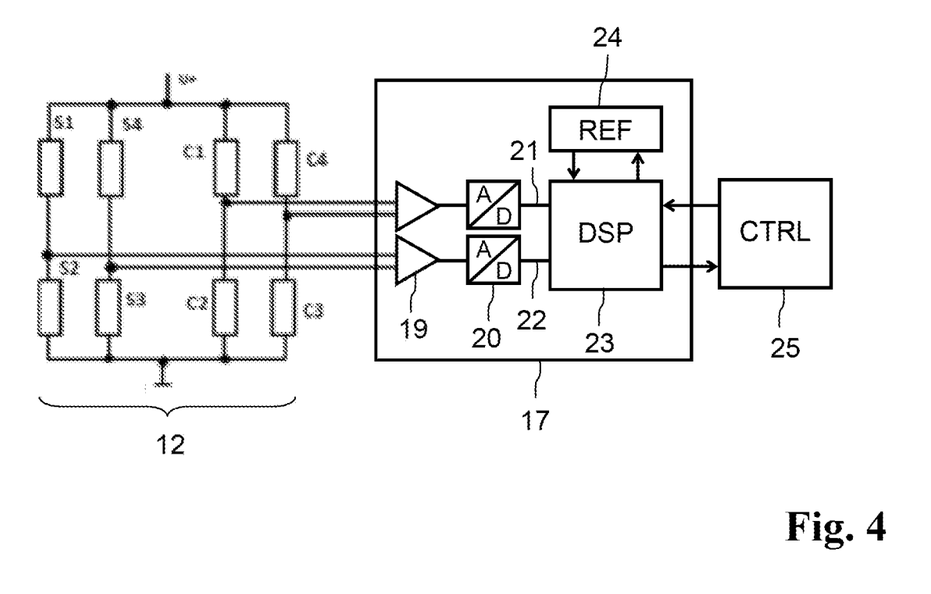
FIG. 4 shows an enlarged view of section B of FIG. 2.

A block diagram of a magnetic field sensor 12 with two bridge circuits on a chip is depicted in FIG. 4 with signal processing electronics 17 according to the disclosure. Each bridge output signal is initially amplified by an amplifier 19, then converted by an analog/digital converter 20 into digital signals 21 and 22 and sent to a digital signal processor 23. This is connected to a memory 24 in which a reference signal, to be defined below, is stored and to a control unit 25 of the machine tool, of which work spindle 1 is a component.

Figure 5:
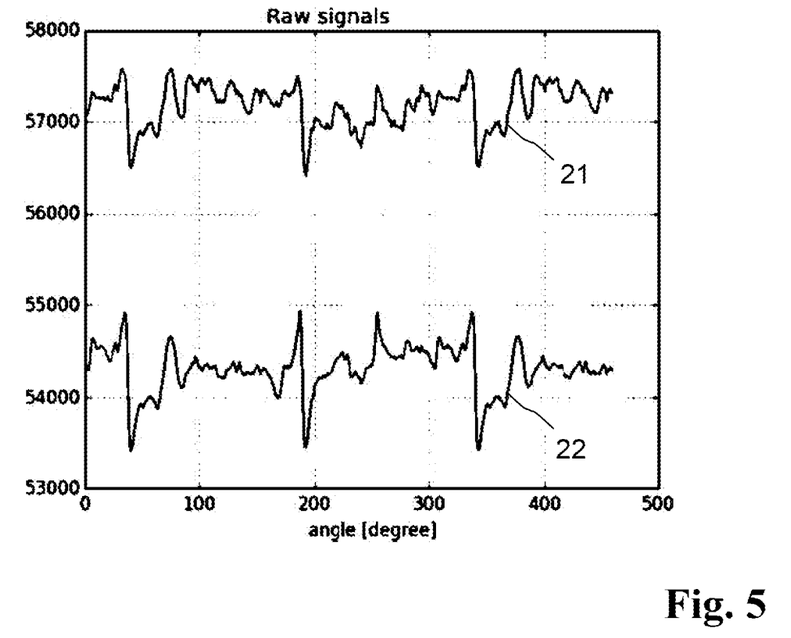
FIG. 5 shows the two measurement signals of the sensor of a device according to the disclosure.

FIG. 5 shows an example of measured waveforms of the raw signals 21 and 22 as a function of the rotation angle of rotor 3 of work spindle 1 over somewhat more than a full revolution. It is apparent that both signals 21 and 22 are extremely noisy, which is due to irregularities in the surface of measurement section 11 of rotor head 5. These irregularities act identically on both signals 21 and 22, as shown by the distinctly visible similarity of the two signals 21 and 22. These raw signals 21 and 22 are still not proportional to an axial deformation of measurement section 11 of rotor head 5. The first operation conducted by the digital signal processor 23 is low-pass filtering of sensor signals 21 and 22, in which case the variable here is not time, but rotation angle of rotor 3, i.e., spatial filtering is involved to suppress spatial noise.

Figure 6:
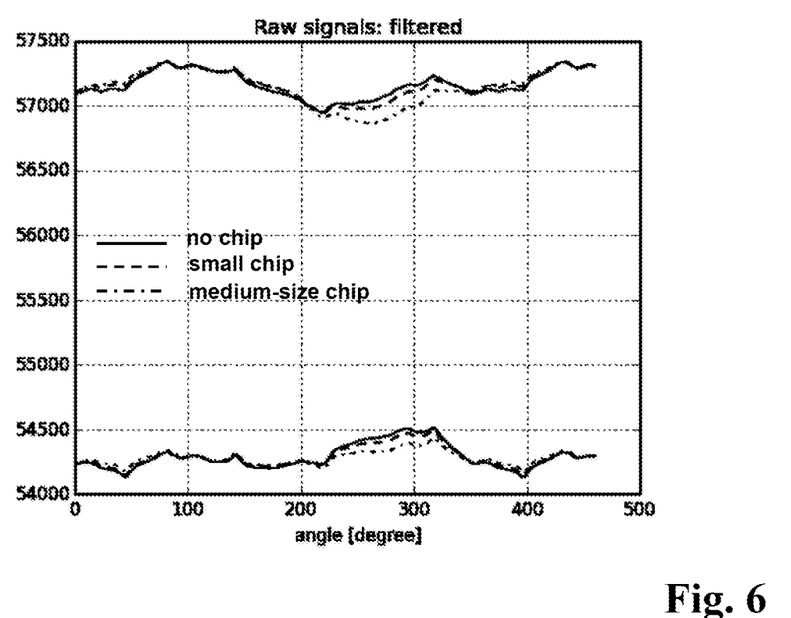
FIG. 6 shows the measurement signals of FIG. 5 for three different cases after low-pass filtering.

FIG. 6 shows an example for the waveforms of signals 21 and 22 as a function of rotation angle of rotor 3 of work spindle 1 over somewhat more than a full revolution after low-pass filtering, in which three different signal waveforms are shown there, namely as a continuous line for the waveform of interference-free tool clamping, i.e., without fouling on the contact surface 8, as a dashed line for the waveform involving fouling on the contact surface 8 from a small chip, and as a dash-dot line for the waveform with fouling on the contact surface 8 through a chip of average size. As is apparent in FIG. 6, the pronounced noise is largely eliminated by low-pass filtering and significant deviations exist in both signals between the waveforms of the three different cases, especially in the rotation angle range between about 220° and 320°.

Figure 7:
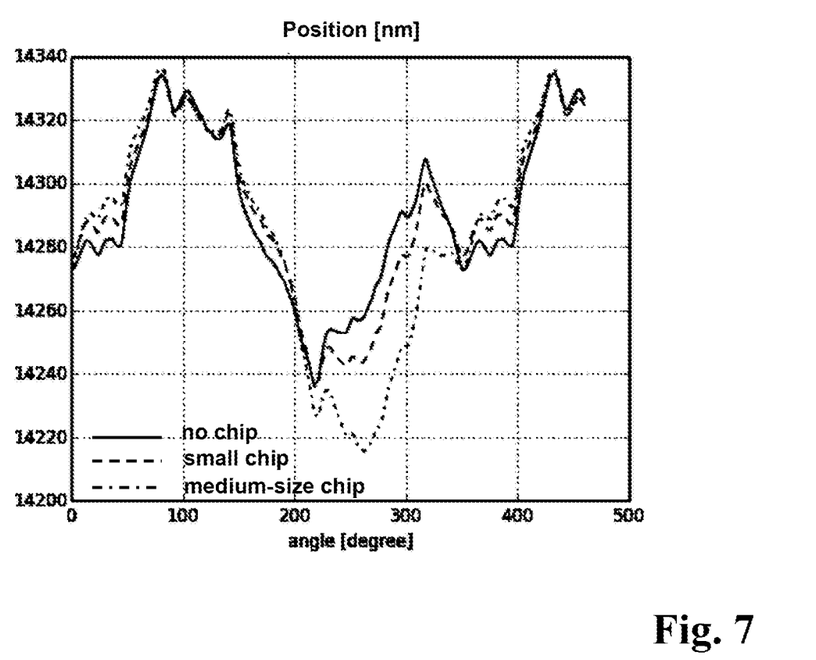
FIG. 7 shows the axial position of the rotor head calculated from the filtered measurement signals of FIG. 6.

A position signal, whose waveform as a function of rotation angle of rotor 3 of work spindle 1 is again shown in FIG. 7 for the three previously mentioned cases, is then calculated using the arctan 2 function from the two low-pass-filtered signals of FIG. 6 in digital signal processor 23. The deviations already recognizable by means of the two individual signals in FIG. 6 between the three different cases are even more distinct in the position signal of FIG. 6, it being apparent that the deviations are not just restricted to the range between about 220° and 320°, although they are largest there. Whereas the scales of the ordinates in FIGS. 5 and 6 are still digitized voltage values, the units for the ordinate of FIG. 7 are nanometers, since the absolute value is less significant there than its change over one revolution of rotor 3, i.e., over a rotation angle of 360°.

As is apparent from FIG. 7, the position signal is periodic and has a similar waveform in all three cases, in which the deviation caused by a chip stuck on the contact surface 8 relative to the waveform during debris-free tool clamping depends on the size of the chip. In order to extract solely this deviation as signal, the mean value of the position signal of FIG. 7 is first calculated over an entire revolution of rotor 3 and subtracted from the position signal of FIG. 7 in order to obtain a position change signal with a mean value of zero. A reference signal stored in a memory 24 (FIG. 3) is then subtracted from this mean-free position change signal. This is the signal obtained from the position signal shown as a continuous line in FIG. 7 by subtraction of its mean value, i.e., the mean-free position change signal in the case of tool clamping free of debris.

Figure 8:
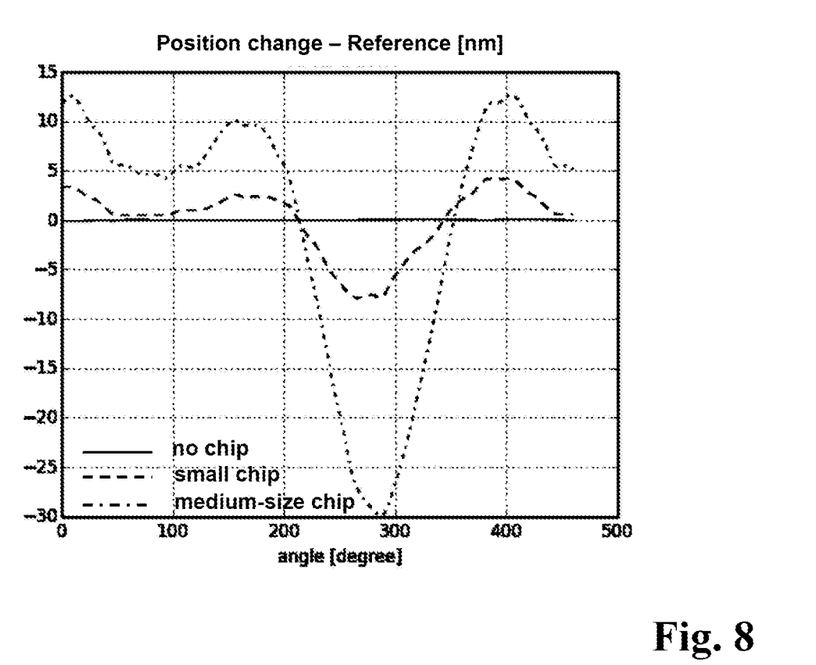
FIG. 8 shows the axial deformation of the rotor head calculated from the position of FIG. 7 and a stored reference signal and FIG. 9 shows a depiction of processing of the sensor signals to detect fouling according to the disclosure in the form of a program sequence.

The result of this operation is shown in FIG. 8. For the case of correct tool clamping, the baseline is logically obtained as signal waveform, since in this case the reference signal is subtracted from itself. In the presence of fouling, significant deviations of the signal waveform from the baseline are already obtained over an entire evolution of rotor 3 even during fouling with a small chip. The units of the ordinate are also nanometers in FIG. 8, i.e., even the smallest axial deformations can be reliably and precisely recognized.

For the accuracy of the waveform depicted in FIG. 8 of the difference from the position change signal and the stored reference signal, it is critically important that the signal being analyzed be properly synchronized with the stored reference signal, i.e., that the value pairs of both signals that are exactly assigned to the same angle position of rotor 3 are subtracted from each other. This can be ensured in that, starting from a known approximation of the correct point-wise assignment of the two signals for different displacement of the two signals relative to each other, their cross-correlation function is calculated and the assignment of value pairs at which the cross-correlation function has a maximum is chosen for the subtraction.

An approximation of the correct point-wise assignment of the two signals can be obtained, for example, by a marking at a location of the circumference of the measurement section 11 of rotor head 5 that produces a characteristic pulse in the output signal of the magnetic field sensor 12. A simple type of such marking is an interruption of short length of grooves 9 or an axial offset of shorter length of grooves 9 and lands 10. Both structures during one revolution of rotor 5 result in a short section of characteristic shape both in a signal being analyzed and in a stored reference signal, which provides an approximate conclusion concerning the correct point-wise assignment of the two signals.

If this marking has the shape of an axial offset of precisely defined extent of grooves 9 and lands 10, it can then also be used for automatic calibration of position determination between a currently recorded position signal and a stored reference signal, in addition to approximate synchronization, since in this case it is precisely known which axial position change of rotor head 5 would correspond to the change in sensor signal occurring on the offset flank of grooves 9 and lands 10.

The difference signal shown in FIG. 8 must then be evaluated as to whether its deviation from baseline is so significant that it indicates the presence of debris on the contact surface. A simple evaluation criterion is exceeding a threshold value by the amount of the difference signal at an arbitrary value of the rotation angle. Another possible criterion is exceeding a threshold value by the mean value of the difference signal over an entire revolution. These criteria can also be combined with each in the form of a logic operations (for example, AND, OR) in order to increase the reliability of error detection.

Figure 9:
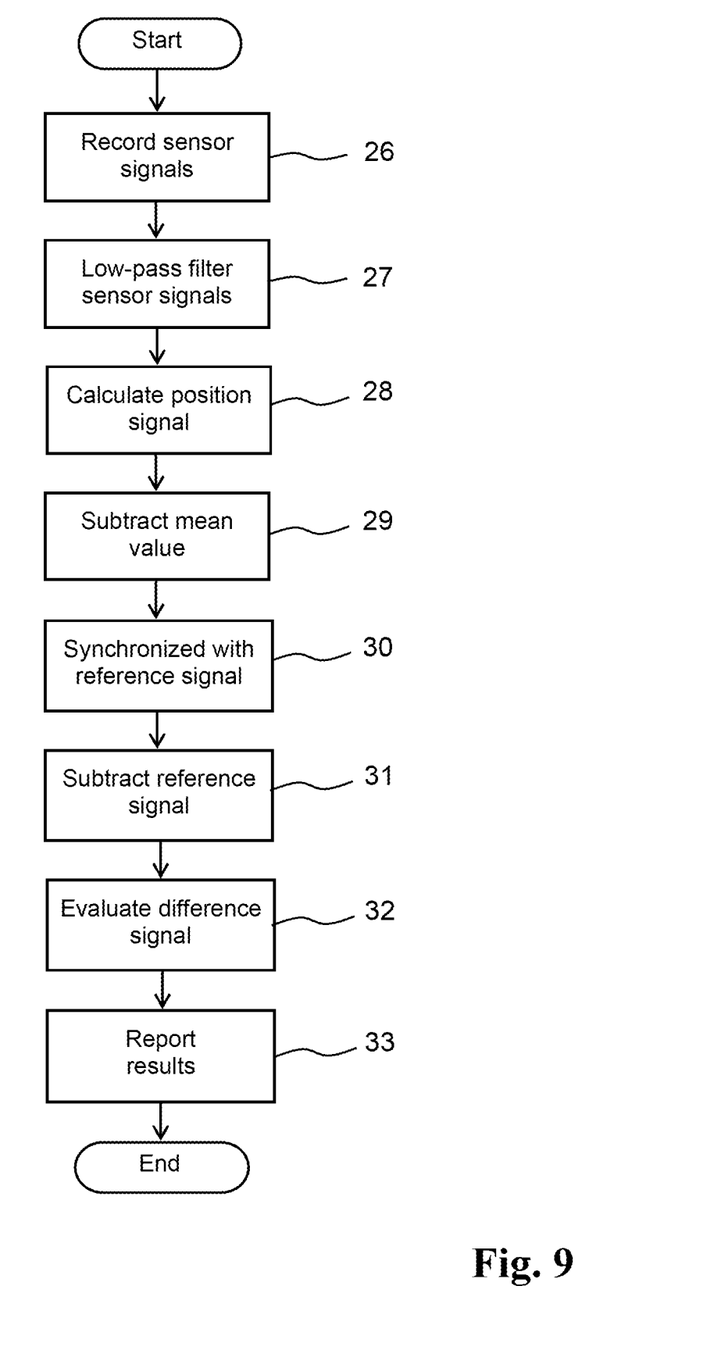

In summary, FIG. 9 shows in the form of a flowchart the functional method of the processing according to the disclosure of the signal recorded by magnetic field sensor 12 in digital signal processor 23 for detection of debris. If a measurement cycle was started, which can be initiated by a corresponding control signal of control unit 25, the two signals 21 and 22 of magnetic field sensor 12 are recorded in step 26 over an entire revolution of rotor 3 of work spindle 1. The signals are subjected in step 27 to spatial low-pass filtering and a single signal is calculated in step 28 from the two phase-shifted signals, indicating the axial position of the measurement section 11 of rotor head 5. Its mean is subtracted in step 29 from this position signal over an entire revolution of rotor 3.

The mean-free position change signal obtained in this way is synchronized in step 30 by means of a cross-correlation with a mean-free reference signal stored in memory 24. The difference of the synchronized signals is calculated in step 31 by subtraction of the reference signal. The difference signal is evaluated in step 32 for the presence of debris and the result of the evaluation is reported to the control unit 25 of the machine tool in step 33.

If debris is reported in step 33, the control unit 25 releases the tool or tool carrier 6 through the clamping device 4, causes its removal from rotor head 5 by the tool changer and automatic cleaning of the contact surface 8. If this does not lead to success, but debris is still found after reclamping of the tool or tool carrier 6, intervention of the operating personnel of the machine tool is required by a corresponding error message. If no debris is found during a check by operating personnel, the established nonuniform deformation of rotor head 5 indicates a defect in the tool clamping device 4 in the form of wear or breakage of an individual collet.

Determination of the reference signal stored in memory 24 also occurs by means of the device according to the disclosure, in which it is ensured by checking before clamping of the tool or tool carrier 6 that no debris is present, and only steps 26 to 28 are conducted from the sequence according to FIG. 9. After step 28, the signal present at this location is stored as reference signal in the memory 24.

A measurement at constant speed of rotor 3 is advantageously the simplest method in each case. Such a measurement can occur, for example, while the work spindle 1 is approaching the machining position after a tool change. The speed in this case can lie well below the normal operating speed. A measurement during acceleration of rotor 3 to the operating speed is also possible in principle, but this requires a higher expenditure of signal processing because of a variation in assignment between time and rotation angle.

If, as a result of performance of the complete procedure, no significant nonuniformity of deformation of rotor head 5 can be found along its circumference, it can be assumed that no debris is present between rotor head 5 and the tool or tool carrier 6.

However, the device according to the disclosure can also be used to determine whether the clamping force of the tool clamping device 4 is in the permissible range. For this purpose, a position measurement of measurement section 11 of rotor head 5 by means of magnetic field sensor 12 during one revolution of rotor 3 occurs during a tool change either in the released state of the tool clamping device 4 or in the clamped state of the device without the presence of a tool or tool carrier 6, i.e., when the rotor head 5 is not axially deformed due to a lack of force flow. The output signals of the magnetic field sensor 12 are processed according to steps 26 to 28 of the procedure shown in FIG. 9. The mean value of the position signal is then calculated in step 29 but not subtracted from the position signal, rather stored instead. After clamping of the tool or tool carrier 6, normal position measurement of the measurement section 11 of rotor head 5 then occurs by means of magnetic field sensor 12 during one revolution of rotor 3 and steps 26 to 28 of signal processing are also carried out according to FIG. 9 and the mean value of the position signal also calculated.

The difference in the position mean values is then calculated, which indicates the axial mean deformation that the measurement section 11 of rotor head 5 was subject to by clamping of the tool or tool carrier 6. This entire procedure is run the first time during start-up of a new tool clamping device 4 and the difference in position mean values before and after clamping of the tool or tool carrier 6 obtained in this case is stored as reference value of axial deformation. During a tool change with tool clamping device 4 in operation, said position mean values are determined in the same way before and after clamping of the tool or tool carrier 6 and then subtracted from the stored reference value.

If one assumes that the clamping force of a new tool clamping device 4 that produced the reference value of axial deformation is correct, then it can be established with an appropriate threshold value whether the clamping force still has a sufficient value by comparison with the deviation of the current difference of position mean values from the reference value. If the comparison shows that the mean axial deformation of rotor head 5 during continuous operation is significantly smaller than the mean axial deformation with the correct clamping force, in which the deviation between the two exceeds a threshold value, the clamping force must have declined beyond the permissible amount, indicating a defect or excessive wear of the tool clamping device 4.

An effect that is superimposed on the position change of measurement section 11 of rotor head 5 as a result of deformation by the clamping force of the tool clamping device 4 is the axial forward shift of the entire rotor 3 of a work spindle 1 as a result of heating of its bearing during operation, known as spindle growth. The position change caused by this is not a deformation of the rotor head 5, but an axial shift of the entire rotor 3. This plays no role in the recognition of debris, since in the latter case the mean values of both the current position signal and the reference signal are eliminated and only the mean-free axial position change of the measurement section 11 of rotor head 5 is evaluated during one revolution.

Spindle growth is potentially significant for the monitoring of the clamping force of the tool clamping device 4, since the change in position of the measurement section 11 of rotor head 5 caused by this has the same direction as its change in position as a result of a smaller axial deformation due to declining clamping force. However, spindle growth is a comparatively slow process, so that it can be assumed that the shift of the rotor 3 caused by this during a tool change, which requires only very little time in modern machine tools, remains almost constant. Measurement of the deformation of measurement section 11 of rotor head 5 as a result of clamping force in the form of difference formation between the positions with and without the action of clamping force on rotor head 5 is therefore not distorted by spindle growth.

On the other hand, spindle growth alone can be recorded by means of the previously mentioned position measurement of measurement section 11 of rotor head 5 by means of magnetic field sensor 12 during one revolution of rotor 3 during a tool change either in the released state of the tool clamping device 4 or in the clamped state of the device without the presence of a tool or tool carrier 6. For this purpose, a first measurement must be conducted in the cold state, i.e., at the beginning of operation of the machine tool, and the obtained measured value then stored as reference value. During operation, a position measurement can be conducted during each tool change in the released state of the tool clamping device 4 or in the clamped state of the device without the presence of a tool or tool carrier 6, and the deviation in position value from the reference value calculated. Since no deformation of the rotor head 5 is present during these measurements, an established position change can only be due to spindle growth.

Alternatively, the position mean value can also be recorded in the clamped tool or tool carrier 6 in the cold state, i.e., at the beginning of operation of the machine tool and during operation, if it can be assumed that its change during operation is caused almost exclusively by spindle growth. This is the case in practice, since the extent of spindle growth is much greater than the extent of axial deformation of rotor head 5 by the clamping force, and the latter also only changes very slowly and slightly during operation.

By means of the measurement device according to the disclosure, depending on the type of signal processing, fouling of a contact surface between rotor head 5 and the tool or tool carrier 6 can therefore be recognized, as well as excess wear or failure of the tool clamping device 4, and spindle growth can be recorded even without the use of an additional sensor.

The invention claimed is:

1. A device for monitoring of a work spindle (1), wherein at least one magnet is arranged on a stator or on a rotor of the work spindle, the magnetic field of which penetrates a measurement section of the rotor head, which is traversed by an axial flux during clamping of a tool or tool carrier on the rotor head by means of a tool clamping device arranged in the rotor, wherein the rotor head in the measurement section has a magnetizability or magnetization varying in an axial direction, wherein at least one direction-sensitive magnetic field sensor is arranged on the stator radially opposite the measurement section, and wherein the magnetic field sensor is connected to an evaluation device, which is set up to determine a measure of axial deformation of the rotor head as a function of a rotation angle from the strength of the magnetic field as a function of rotation angle recorded by the magnetic field sensor during one revolution of the rotor.

2. The device of claim 1, wherein the evaluation device is set up to determine a measure of an axial position of the rotor head relative to the stator from the strength of the magnetic field as a function of the rotation angle recorded by the magnetic field sensor during one revolution of the rotor.

3. The device of claim 1, wherein a magnet (14) with radial alignment of its poles is arranged on stator (2) radially opposite the measurement section (11) of rotor head (5) and in that the measurement section (11) of rotor head (5) has on its surface at least two grooves (9) separated from each other in the axial direction and running in the circumferential direction.

4. The device of claim 3, wherein the grooves (9) have a marking of predetermined length in the circumferential direction on at least one location in the circumferential direction of measurement section (11) of rotor head (5) in the form of an interruption or an axial offset of predetermined extent.

5. The device of claim 1, wherein at least three magnets are arranged in sequence axially in the measurement section (11) of rotor head (5) or at least three axially consecutive areas of rotor head (5) are magnetized, in which case the magnetic poles are each aligned in the radial direction and two axially consecutive magnets or magnetized areas have a reversed radial arrangement of the magnetic poles.

6. The device of claim 5, wherein the magnets or magnetized areas arranged in the measurement section (11) of rotor head (5) have a marking of predetermined length in the circumferential direction on at least one location in the circumferential direction of measurement section (11) of the rotor head in the form of an interruption of magnetization or an axial offset of predetermined extent of the magnetization.

7. The device of claim 1, wherein the magnetic field sensor (12) is a magnetoresistive sensor having at least one bridge circuit of resistors, the value of each of which depends on the strength and direction of a magnetic field penetrating it, and in that the axial variation of magnetizability or magnetization of measurement section (11) of rotor head (5) is periodic and the geometric arrangement of resistors in the axial direction is matched to this axial variation, so that an axial displacement of the rotor head (5) relative to stator (2) by a period length (L) of the axial variation results in a periodic waveform of the output signal of the bridge circuit as a function of the axial displacement of the rotor head (5) with the same period length (L).

8. The device of claim 1, wherein the evaluation device (17) contains a memory (24), in which a reference signal is stored, which was derived from at least one sensor signal recorded during a revolution of rotor (3) with a correctly clamped tool or tool carrier (6), and in that the evaluation device (17) is set up to determine the axial deformation of rotor head (5) by means of the deviation between a signal that was derived from at least one sensor signal (21, 22) recorded during one revolution of rotor (3) with a clamped tool or tool carrier (6) and the stored reference signal.

9. The device of claim 1, wherein the evaluation device (17) is set up to derive a signal indicating an incorrect clamping state of a tool or tool carrier (6) from the axial deformation of rotor head (5).

10. The device of claim 1, wherein a number of direction-sensitive magnetic field sensors (12) are arranged spaced apart from each other in the circumferential direction of stator (2) on stator (2), radially opposite the measurement section (11) of rotor head (5) and are each connected to the evaluation device (17).

11. A method for monitoring of a work spindle with the device of claim 1, the method comprising:
   a) recording of at least one signal, which is derived from at least one signal produced by the magnetic field sensor within one revolution of the rotor with a tool or tool carrier clamped on the rotor of the work spindle;
   b) calculating from the at least one recorded signal a position signal, which indicates the axial position of the measurement section of the rotor head radially opposite the magnetic field sensor as a function of the rotation angle of the rotor within one revolution of the rotor;
   c) calculating a difference signal as a function of the rotation angle of the rotor within one revolution of the rotor from the calculated position signal and a reference signal stored in a memory;
   d) determining at least one dimension for the axial deformation of the rotor head from the calculated difference signal;
   e) comparing the determined dimension for the axial deformation of the rotor head with a limit value and issuing of a status signal, which indicates an incorrect clamping state of the clamped tool or tool carrier, as a function of the comparison result.

12. The method of claim 11, wherein the reference signal is determined by using steps a) and b) during correct clamping of an equivalent tool or tool carrier and stored in the memory.

13. The method of claim 11, wherein during performance of step c) the corresponding mean value of the position signal and the reference signal is calculated and a mean value initially subtracted from each of the two signals, wherein the mean-free reference signal is subtracted from the mean-free position signal to calculate the difference signal, and wherein the status signal indicates presence of debris between the clamped tool or tool carrier and a surface of the rotor head.

14. The method of claim 11, wherein during determination of the reference signal, steps a) and b) are performed a first time without the action of axial force on the rotor head and a second time with a properly clamped equivalent tool or tool carrier, wherein the reference signal is calculated by subtraction of the position signal obtained during the first performance from the position signal obtained during the second performance, wherein during performance of step c) the corresponding mean value of the position signal and the reference signal is calculated, wherein the mean value of the reference signal is subtracted from the mean value of the position signal to calculate the difference signal, and wherein the status signal indicates the exertion of an insufficient clamping force by the tool clamping device.

15. The method according to claim 11, wherein steps a) and b) are performed without action of an axial force on the rotor head in a defined reference state of work spindle and the mean value of the obtained position signal is calculated and stored as a reference mean value, and wherein steps a) and b) are performed without the action of an axial force on the rotor head in a current operating state of the work spindle and the current mean value of the obtained position signal is calculated and an axial displacement of the rotor head relative to the stator is calculated by subtraction of the reference mean value from the current mean value and sent to a higher level control unit.

\* \* \* \* \*